Patented Dec. 31, 1940

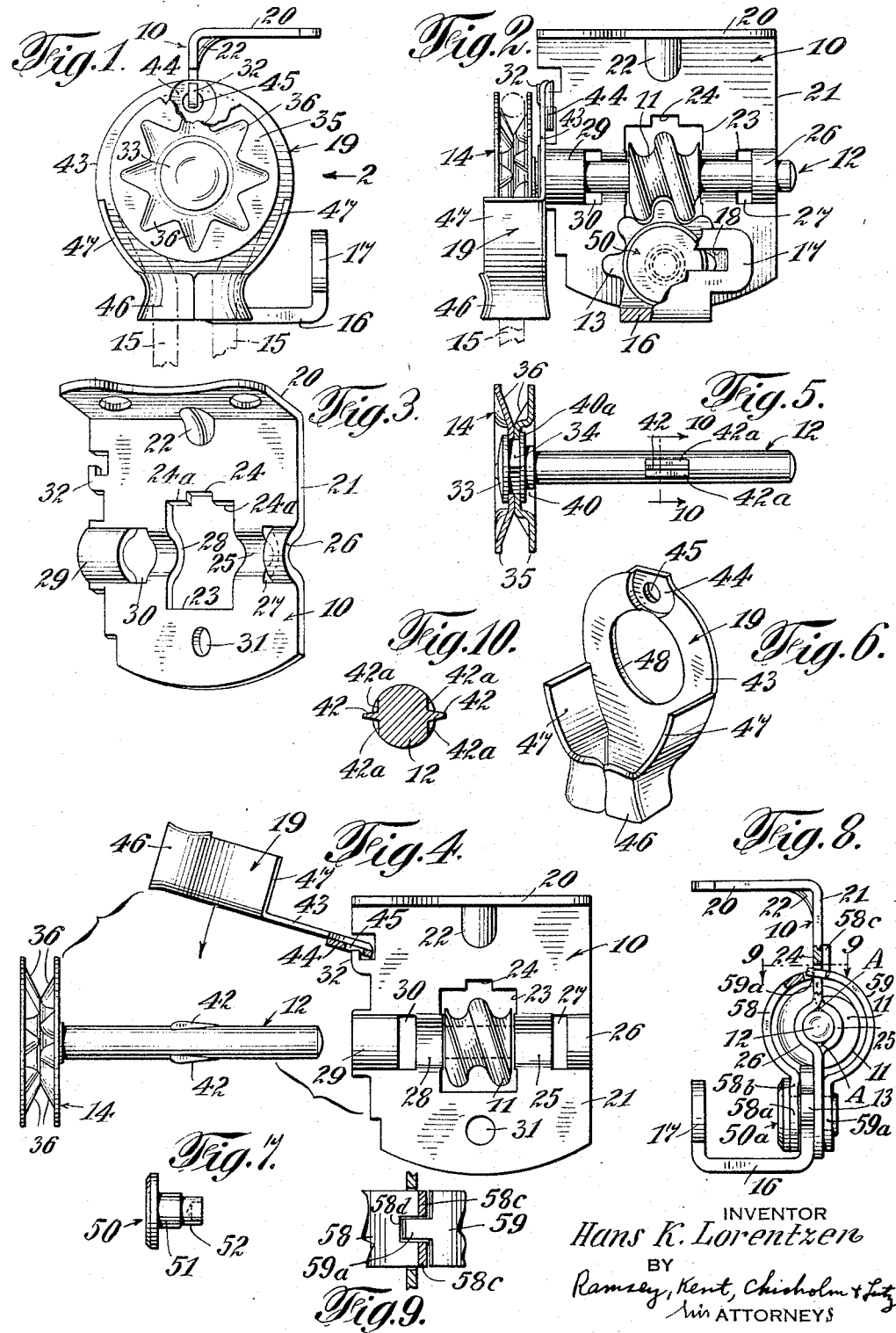

2,226,623

UNITED STATES PATENT OFFICE 2,226,623

VENETIAN BLIND TILTER

Hans K. Lorentzen, Montclair, N. J., assignor to Lorentzen Hardware Mf'g Corp., New York, N. Y., a corporation of New York Application July 15, 1938, Serial No. 219,303

8 Claims. (Cl. 156—17)

This invention relates to Venetian blind tilting devices, and it is particularly applicable to such devices of the worm-and-gear type. For convenience, these devices are referred to as merely as "tilters."

Among the general objects of the invention are to simplify the manufacture, reduce the probability of manufacturing errors, reduce the cost, and increase the reliability of Venetian blind tilters.

Another object of the invention is to provide a worm-and-gear Venetian blind tilter of such construction that it lends itself to rapid economical manufacture on a quantity production basis.

Further objects of the invention are to reduce the number of parts and reduce the number of manufacturing operations for Venetian blind tilters.

Various other objects will be apparent from the accompanying disclosure.

Fig. 1 of the drawing is a front elevation of a tilter involving the present invention, a section of the pulley being cut away.

Fig. 2 is a side elevation partially in section, showing the tilter of Fig. 1 when viewed from the direction of the arrow 2.

Fig. 3 is an isometric view of a bracket stamping incorporated in the tilter.

Fig. 4 is an exploded view showing in unassembled relation certain parts of the tilter.

Fig. 5 is a plan view, partially in section, showing a shaft and pulley assembly incorporated in the tilter.

Fig. 6 is a perspective view of an oscillatory cord or chain guide incorporated in the tilter.

Fig. 7 is an elevation of a pivot stud by which the gear is mounted.

Fig. 8 is a rear elevation, partially in section, of a modified form of tilter embodying the present invention. For the sake of clarity the cord guide and pulley have been omitted from this view.

Fig. 9 is a detail sectional view taken approximately on the line 9—9 of Fig. 8.

Fig. 10 is a detail section taken on line 10—10 of Fig. 5.

As shown more particularly in Figs. 1 and 2, the tilter comprises a supporting bracket designated as a whole by 10, a worm 11, a shaft 12 rotatably mounted on the bracket, and a gear 13 pivotally attached to the bracket and meshing with the worm. On the forward end of the shaft 12 there is a pulley 14 adapted to be driven, for example, by a cord 15 to rotate the worm 11 in either direction and thereby oscillate gear 13. Gear 13 is formed on one leg of a U-shaped rocking member 16; and the other leg 17 is slotted at 18 to detachably receive a tilt bar connecting member (not shown) as is well understood in the art. Pivoted between the pulley 14 and the bracket 10 there is an oscillatory cord guide, designated as a whole by 19.

The supporting bracket 10 is a unitary sheet-metal stamping having the various parts shown in Fig. 3. This stamping has a horizontal leg 20 that is adapted to be screwed to the head bar or other supporting structure from which the Venetian blind is suspended. It also has a vertical leg 21 on which the actuating elements of the tilter are mounted. Formed between legs 20 and 21 is an in-pressed rib 22 which strengthens the bracket. Approximately centrally of the vertical leg 21 there is formed a rectangular opening 23 having its upper edge recessed at 24. On opposite sides of the opening 23 the metal of the bracket is cut, and pressed into arcuate straps which form journals for the worm shaft 12. One journal is formed by arcuate straps 25 and 26 which are so pressed as to face in opposite directions, and which are separated axially of the journal by a space 27 formed by cutting out the metal of the bracket. Similarly on the other side of the opening 23 another journal is formed by arcuate straps 28 and 29 which are pressed out in opposed relation and are separated axially of the journal by space 30. The vertical dimension of cut-outs 27 and 30 is greater than the diameter of shaft 12, to permit the arcuate straps to be so shaped as to provide the journals with radial clearance such as indicated at A, A, Fig. 8. The purpose of this clearance will be disclosed later on. Near its bottom the vertical leg 21 of the bracket is provided with a hole 31 to receive the pivot stud of the gear 13. On the forward edge of the vertical leg there is a hook 32 to pivotally support the oscillatory cord or chain guide 19.

The shaft 12 is initially formed with a round head 33 adjacent which is a square shank portion 34 (Fig. 5). The pulley 14 is composed of two more or less conically shaped sheet-metal stampings 35, 35. These stampings have radial ribs 36 (eight shown in each stamping) which act to grip the cord 15 and prevent it from slipping on the pulley. Each of the pulley stampings 35, 35 is provided with a centrally positioned square hole corresponding to the square shank 34 of the shaft. The stampings 35, 35 may be identical; and the diagonal of the square hole in the stamping is preferably on a diameter which is located one-quarter of the distance between adjacent radial ribs. With such coordination of the square hole with the ribs, assembly of the two stampings to form a pulley will bring the ribs 36 on one stamping in staggered relation with the ribs 36 on the other stamping, as shown (for example) in Fig. 4. Ribs in staggered relation grip the pulley cord more effectively than do ribs in aligned relation.

After the two pulley stampings have been assembled onto the square shank portion of the shaft 12, the axially projecting metal of the shank is swaged by a cylindrical tool, thus displacing the metal from annular space 40 and forming an integral collar 40a. This collar tightly binds the pulley stampings 35, 35 together and permanently affixes the pulley 14 to the shaft 12.

Near its center the shaft is swaged to form oppositely projecting fins 42, 42. As shown in Fig. 4, these fins are wedge-shaped in their plane axially of the shaft; and as shown in Fig. 10, they are also wedge-shaped in a cross-axial plane. On either side of the fins 42, 42 there are zones 42a, 42a which are depressed below the contour of the shaft.

The cord guide 19 has a disc portion 43 apertured at 48 and having at its top an in-struck zone 44 perforated at 45. At the bottom, the guide is formed into a throat 46 through which the ends of the cord or chain pass; and from the throat 46 guide wings 47, 47 project upwardly to extend part way around the circumference of the pulley 14.

In assembly, the cord guide 19 is applied to the hook 32, as indicated in Fig. 4, the hole 45 being placed on the hook and the cord guide being swung down so that the aperture 48 is aligned with the journals in the bracket stamping. The worm 11, preferably a machined brass worm, is positioned in opening 23; and the free end of shaft 12 is then telescoped through aperture 48 of the cord guide, through the journal formed by straps 28 and 29, through the worm 11 and into the journal formed by straps 25 and 26. This movement is effected with fins 42, 42 positioned in a vertical plane so that they may pass through the journal clearance as at A, A (Fig. 8), which is provided for that purpose. When the fins 42, 42 reach the worm 11, the pulley and shaft assembly are forcibly telescoped into the worm, so that the fins are forced into driving and holding engagement with the worm. Thus, mere assembly of the shaft-pulley unit with the bracket and worm, affixes the worm to the shaft and prevents accidental withdrawal of the shaft. As fins 42, 42 enter the worm they displace metal from the worm; and the shaft depressions 42a, 42a provide space to accommodate this displaced metal. Thus, the assembly operation does not result in the formation of burrs at the end of worm 11, which would interfere with the free rotation of the worm.

Either before or after the assembly above described, the U-shaped rocker 16 may be assembled onto the bracket by pivotally attaching gear 13 to the bracket. Preferably the gear is affixed by a pivot stud 50 (Fig. 7), having a shank portion 51 which passes through the gear and which has a reduced extension 52 that passes through the hole 31 in the bracket and is riveted thereto.

The tilter shown in Fig. 8 is the same as previously described, except for sheet-metal guard members 58 and 59. In this figure the reference characters from the other figures are applied to indicate identical parts. However, to avoid confusion, the showing of pulley 14 and guide 19 has been omitted from this figure.

Guards 58 and 59 have arcuate body portions, each of which extends adjacent to approximately half of the circumference of the worm 11; and the guards preferably have perforated flat extensions 58a and 59a through which pass the pivot stud for the gear 13. When these guards are used, the pivot stud 50a should, of course, have a shank longer than the shank of stud 50 shown in Fig. 7. As shown in Fig. 8, the guard extension 58a lies adjacent to the outer face of the gear 13, and thus it can be used to give the gear additional support against canting. Preferably this guard is formed with a ridge 58b which receives the canting pressure of gear 13. Such a ridge effectively supports the gear and permits the structure to be designed with liberal operating clearance between gear 13 and the flat portion 58a of the guard. Guard extension 59a lies directly against the opposite face of the bracket.

At its upper end guard 58 is provided with hook extensions 58c, 58c which are separated by a space 58d that corresponds to bracket recess 24 (Fig. 3). These extensions pass under edges 24a, 24a of the bracket (Fig 3) and extend upwardly against the opposite face of the bracket as shown in Fig. 8. Guard 59 is provided with a tongue 59a which enters the recess 24 and/or the space 58d. This prevents rotative movement of guard 59 about the pivot stud 50a. If desired, either one of the guard members 58 or 59 may be omitted, and of course both of them may be omitted as shown in Figs. 1 and 2.

It will be noted that the tilter disclosed provides a simple construction, that the parts are relatively few, and that the assembly is simple and well adapted for quantity production.

In compliance with the patent statutes, I have disclosed the best forms in which I have contemplated applying my invention, but it will be understood that the disclosure is illustrative of the invention and does not limit the scope of the same.

What I claim is:

1. In a Venetian blind tilting device of the type in which a worm-and-gear are assembled with a stamped sheet-metal supporting bracket, the worm being mounted on a shaft and being located in an opening in the bracket; the improvement which comprises: journals for said shaft on opposite sides of said opening, each journal including an arcuate shaft-bearing sheet-metal strap stamped out from the metal of the bracket and an opposed sheet-metal strap integral with the metal of the bracket, the two opposed straps being in permanently fixed relationship to telescopically receive the shaft.

2. In a Venetian blind tilting device of the type in which a worm-and-gear are assembled with a supporting bracket, the worm being mounted on a shaft and being located in an opening in the bracket; the improvement which comprises: journals for said shaft on opposite sides of said opening, each journal being composed of opposed arcuate shaft-bearing portions, and at least one of the journals having clearance for the longitudinal passage of a fin projecting sidewise from said shaft.

3. In a Venetian blind tilting device of the type in which a worm-and-gear are assembled with a supporting bracket, the worm being mounted on a shaft and being located in an opening in the bracket; the improvement which comprises:

journals for said shaft on opposite sides of said opening, each journal being composed of a pair of opposed arcuate metal strap portions integral with and forming a part of the bracket, the two portions of each pair being located in staggered relation, and at least one of the journals having clearance for the longitudinal passage of fins projecting sidewise from said shaft.

4. For a Venetian blind worm-and-gear tilter, a one-piece stamped sheet-metal bracket having a horizontal leg and a vertical leg, the vertical leg having an opening therein and having journals formed on opposite sides of such opening, each journal being composed of arcuate strap portions pressed out from the bracket metal and facing in opposite directions.

5. For a Venetian blind worm-and-gear tilter, a one-piece stamped sheet-metal bracket having a horizontal leg and a vertical leg, the vertical leg having an opening therein and having journals formed on opposite sides of such opening, each journal being composed of arcuate strap portions pressed out from the bracket metal and facing in opposite directions, and the component straps of each journal being arranged in staggered relation.

6. In a Venetian blind tilting device of the type in which a worm-and-gear are assembled with a supporting bracket, the worm being located in an opening in the bracket, and the gear being attached to the bracket by a pivot stud; the improvement which comprises: an arcuate sheet-metal guard overlying the worm, such guard being also secured to the bracket by said pivot stud.

7. In a Venetian blind tilting device of the type in which a worm-and-gear are assembled with a supporting bracket, the worm being located in an opening in the bracket, and the gear being attached to the bracket by a pivot stud; the improvement which comprises: an arcuate sheet-metal guard overlying the worm, such guard being also secured to the bracket by said pivot stud, and the guard and bracket being provided with interfitting formations to prevent rotative movement of the guard on the pivot stud.

8. A worm-drive Venetian blind tilter which comprises: a supporting bracket having an opening and journals on opposite sides of the opening; a shaft; a pulley on one end of the shaft; swaging on the shaft affixing the pulley thereto and forming projecting fins between the ends of the shaft; a perforated guide for the flexible element that is to rotate the pulley, the guide being attached to said bracket; and a worm in said bracket opening; the shaft extending through said guide, said journals, and said worm and having its projecting fins in driven engagement with said worm.

HANS K. LORENTZEN.